March 14, 1961

C. C. STUART 2,974,999

VEHICLE TRANSPORT TRAILER

Filed May 29, 1957

INVENTOR.
CLARENCE C. STUART
BY
Barnes, Kisselle, Laughlin & Raisch
ATTORNEYS.

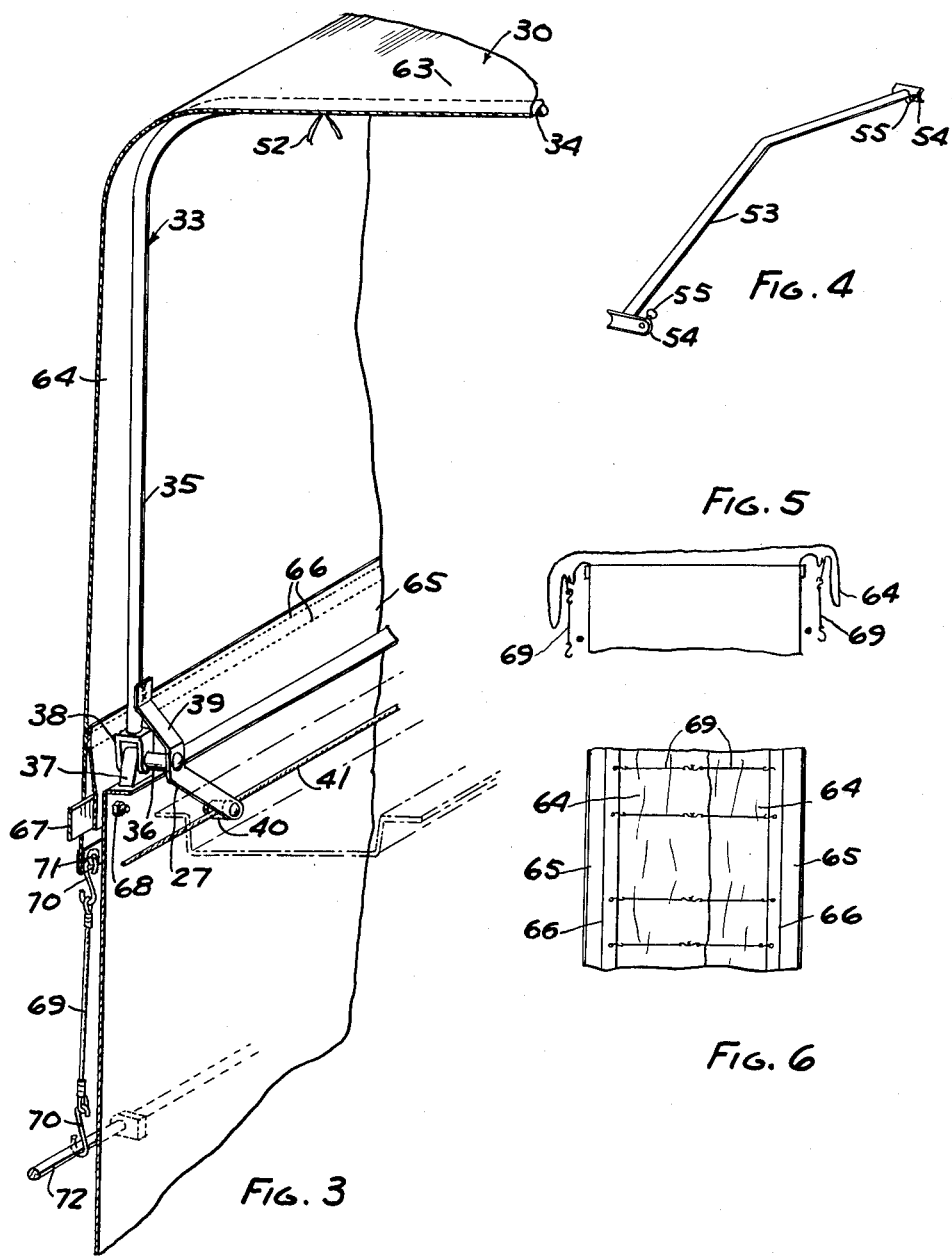

March 14, 1961  C. C. STUART  2,974,999
VEHICLE TRANSPORT TRAILER
Filed May 29, 1957                                    5 Sheets-Sheet 3

INVENTOR.
CLARENCE C. STUART
BY
*Barnes, Kisselle, Laughlin & Raisch*
ATTORNEYS

March 14, 1961  C. C. STUART  2,974,999
VEHICLE TRANSPORT TRAILER
Filed May 29, 1957  5 Sheets-Sheet 4
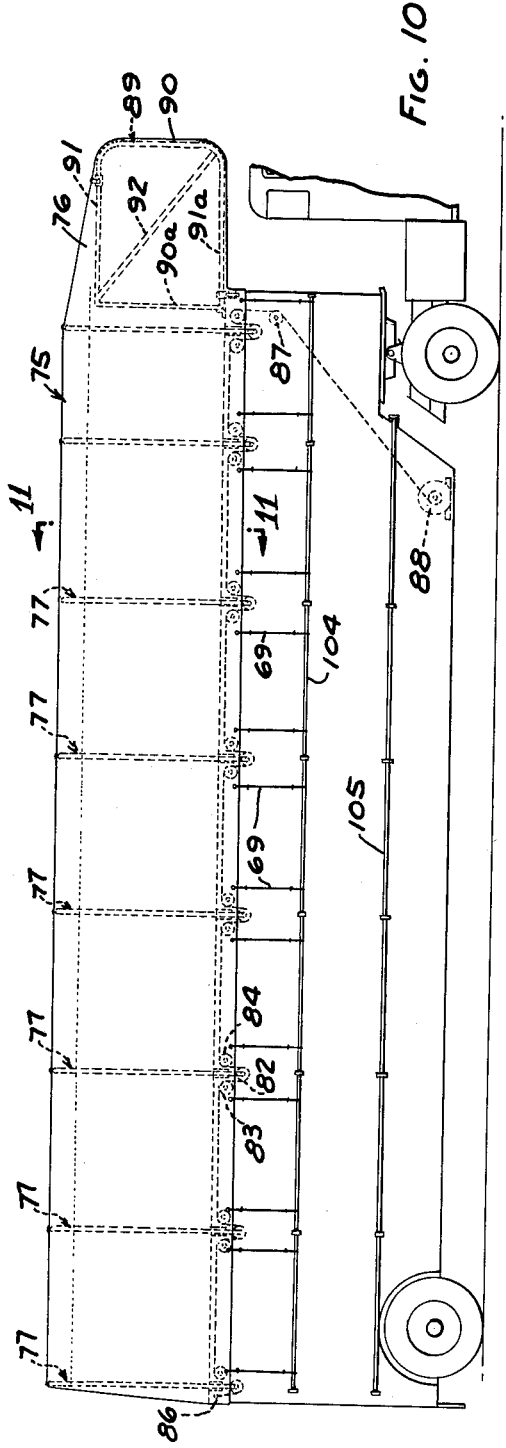
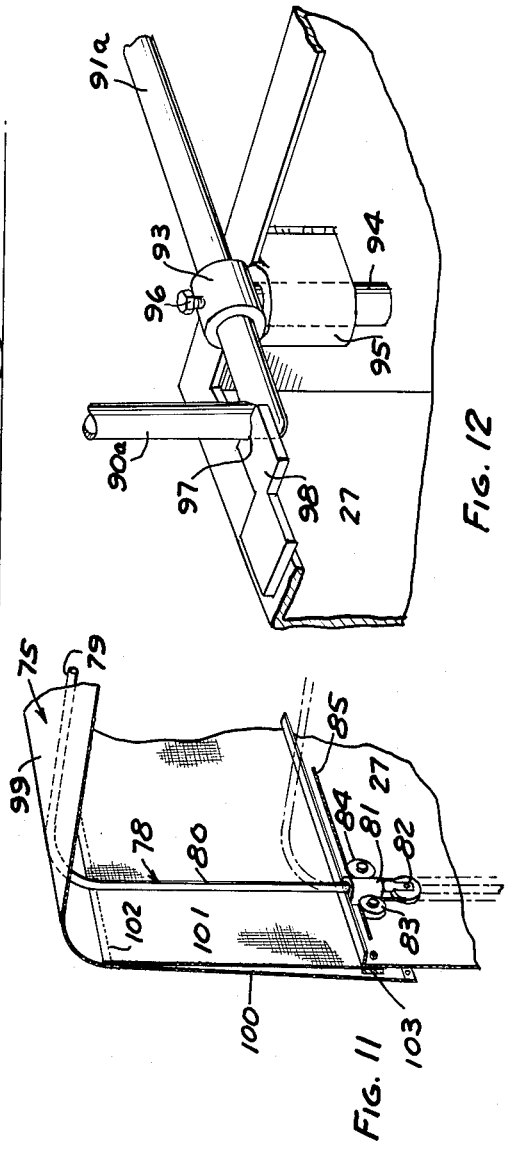
INVENTOR.
CLARENCE C. STUART
BY
Barnes, Kisselle, Laughlin & Raisch
ATTORNEYS

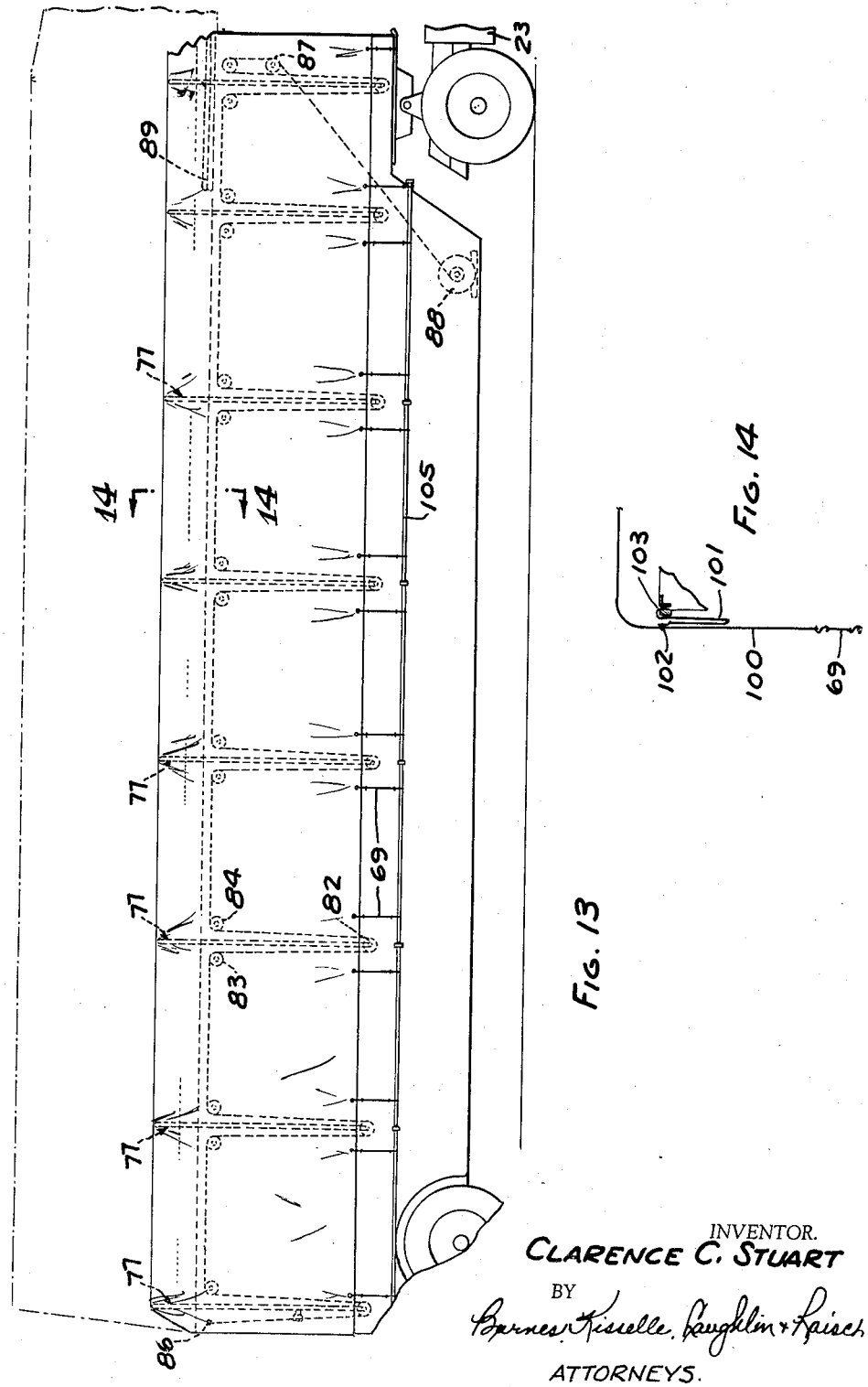

United States Patent Office 2,974,999
Patented Mar. 14, 1961

2,974,999

VEHICLE TRANSPORT TRAILER

Clarence C. Stuart, Dearborn, Mich., assignor to Traffic Transport Engineering, Inc., Dearborn, Mich., a corporation of Michigan Filed May 29, 1957, Ser. No. 662,374

18 Claims. (Cl. 296—105)

This invention relates to a trailer for transporting automotive vehicles and particularly to a trailer which is designed for transporting automobiles over long distances.

Trailers now used for transporting automobiles over long distances usually comprise an open steel framework having upper and lower decks on which four or five automobiles are mounted. When automobiles are transported in this manner over long distances, they are often damaged by sand, flying stones, etc. Such damage in some instances requires extensive repair which is quite costly, especially in the case of the more expensive makes of automobiles.

The use of a fully enclosed trailer, one that is built up with metal sides and top, for example, for transporting such automobiles is impractical because on the return trip of the empty trailer to the automobile assembly plant, the wind resistance of such a large fully enclosed trailer increases the fuel consumption considerably as compared with trailers having an open framework.

In order to minimize such damage, it is customary at the present time to utilize a trailer having upper and lower decks and to use canvas covers over the automobile vehicles which covers are strapped tightly around the main portions of the vehicles. The use of canvas covers strapped to the vehicles is very detrimental, since sand and dirt often get between the cover and the vehicle and act as an abrasive, scratching and wearing away the paint surface.

It is therefore an object of this invention to provide a trailer for transporting automotive vehicles which will adequately protect the vehicles from the elements such as rain, snow, sand and wind.

It is a further object of this invention to provide such a trailer which incorporates a collapsible cover for the upper deck thereby permitting the trailer to be substantially reduced in overall height for the return trip to the factory.

In the drawings:

Fig. 3 is a fragmentary perspective view on a greatly enlarged scale showing a portion of the trailer as viewed from the inside.

Fig. 4 is a perspective view of a cross bar used in the forward part of the trailer.

Fig. 5 is a diagrammatic elevational view showing the trailer in partly collapsed condition.

Fig. 6 is a fragmentary plan view of a portion of the trailer shown in Fig. 2.

Fig. 10 is a fragmentary elevational view of a modified form of trailer and tractor.

Fig. 11 is a fragmentary perspective view of a portion of the trailer shown in Fig. 10 as viewed from the inside.

Fig. 12 is a fragmentary perspective view of the front portion of the trailer shown in Fig. 10 looking in a forwardly direction.

Fig. 13 is a fragmentary side elevational view of the trailer shown in Fig. 10 with the parts in collapsed condition.

Fig. 14 is a sectional view taken along the line 14—14 in Fig. 13.

Figure 1:
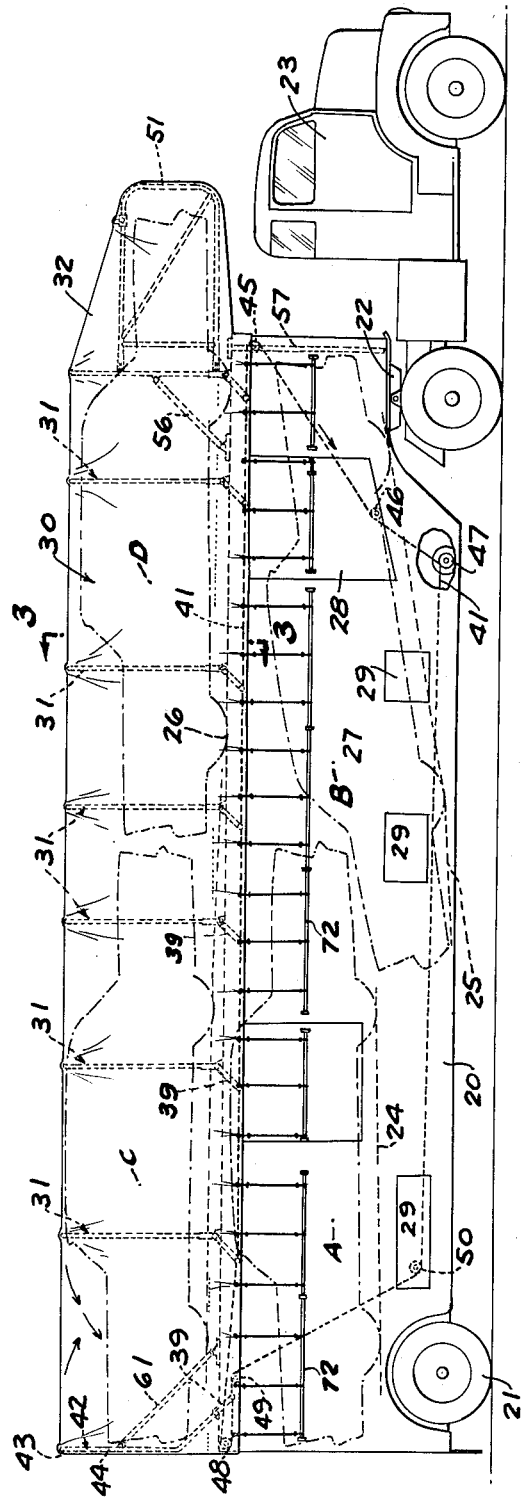
Fig. 1 is a side elevational view of a tractor and trailer embodying the invention, showing the trailer in fully loaded position.

Referring to Fig. 1, transport trailer 20 is provided with wheels 21 at the rear end thereof and is pivoted to tractor 23 by a fifth wheel assembly 22 at the front end thereof. Trailer 20 includes lower parallel spaced and longitudinally extending tracks 24, 25 forming a lower deck and upper parallel spaced and longitudinally extending tracks 26 overlying the lower tracks 24, 25 and forming an upper deck. The trailer also includes vertical metal side walls 27 which enclose the area extending between the upper and lower decks. Access doors 28 and access openings 29 are provided in the side walls 27. Automotive vehicles A and B are loaded on lower tracks 24, 25 between the side walls 27. Automotive vehicles C, D are loaded on the upper track 26.

A cover 30 of flexible material is supported by a frame assembly 31 in overlying relationship to cars C, D, in order to protect the cars from the elements. The frame assembly 31 is collapsible so that after the vehicles are delivered to their destination the frame assembly and cover may be collapsed to reduce the overall height of the trailer 20 for the return trip to the vehicle factory.

Cover 30 is made of a flexible and tough material which is impervious to the elements and which maintains its flexibility at both high and low temperatures which might be encountered in transporting the vehicles. Cover 30 is preferably fashioned from nylon fabric coated with synthetic rubber such as Geon.

As shown in Fig. 1, cover 30 forms an enclosure over the upper deck of the trailer and includes a boot extension 32 at the forward end thereof. Frame assembly 31 includes a plurality of longitudinally spaced U-shaped bows 33 (Figs. 3 and 7) comprising a top bar 34 and side bars 35. The lower end of each side bar 35 is pivotally mounted by a pin 36 on a block 37 which, in turn, is supported on side walls 27 of the trailer. As shown in Fig. 3, a yoke 38 is formed on the lower end of each side bar 35 and pin 36 passes through the arms of the yoke. Pin 36 has one end thereof projecting inwardly and a lever 39 is pivoted on the pin intermediate its ends. The upper end of lever 39 is fastened as by welding to side bar 35 and the lower end thereof is provided with a block 40 which clamps cable 41 to the lower end of lever 39.

As shown in Fig. 1, bow 42 at the rear end of the trailer includes a top bar 43 and side bars 44 which have the lower ends thereof inclined forwardly and pivoted to the side walls 27 in the same manner as bows 33. As further shown in Fig. 1, cable 41 is fastened to the lower end of lever 39 of each side bar 35 and passes over pulleys 45, 46 at the forward end of the trailer to a power-operated drum 47. The other end of the cable 41 passes around pulleys 48, 49 and 50 at the rear end to the power drum 47 so that the cable is under tension at all times.

Figure 2:
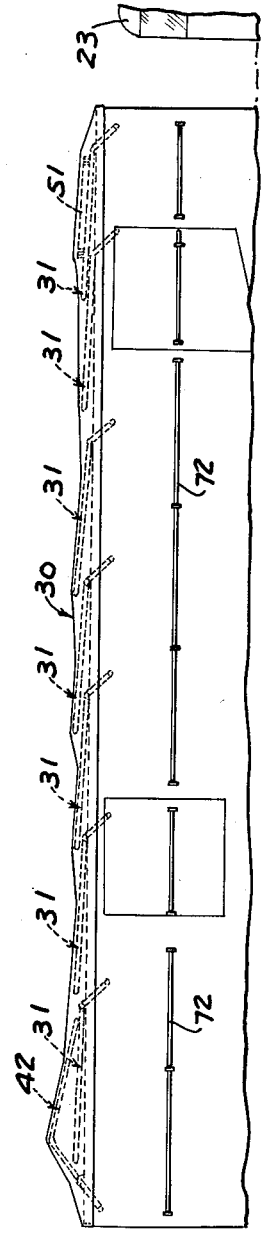
Fig. 2 is a fragmentary side elevational view of the trailer in collapsed condition.

The lever 39 on rear bow 42 is fastened to the reach of cable 41 which extends between pulleys 48 and 49. By this arrangement, when the drum 47 is operated to pull the cable in the direction of the arrow shown in Fig. 1, the bows 33 are pivoted downwardly and rearwardly while the rear bow 42 is pivoted downwardly and forwardly to the position shown in Fig. 2. It should be understood that a cable is provided on each side of the trailer and extends to the drum 47 in order to provide an equal force on the bows to raise them to the extended or erect position and lower them to the collapsed position.

Figure 7:
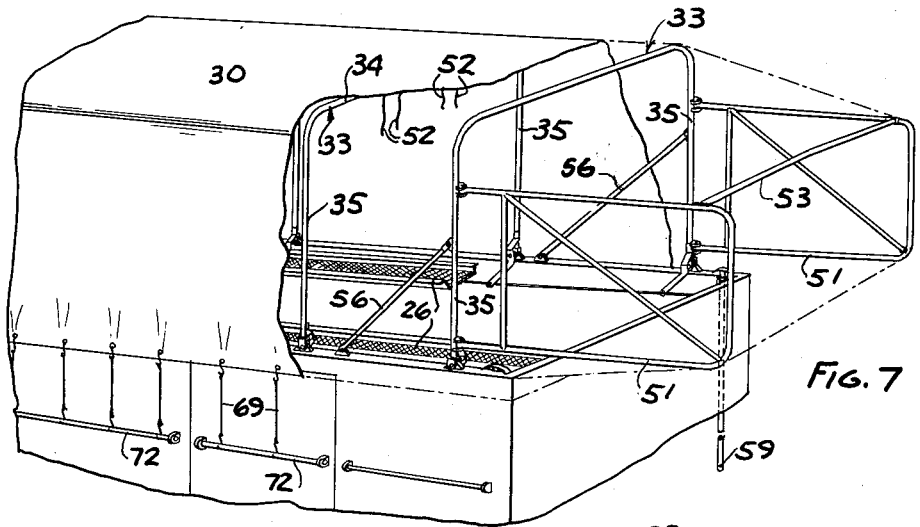
Fig. 7 is a perspective view on an enlarged scale of the forward part of the trailer shown in Fig. 1, parts being broken away.
Figure 8:
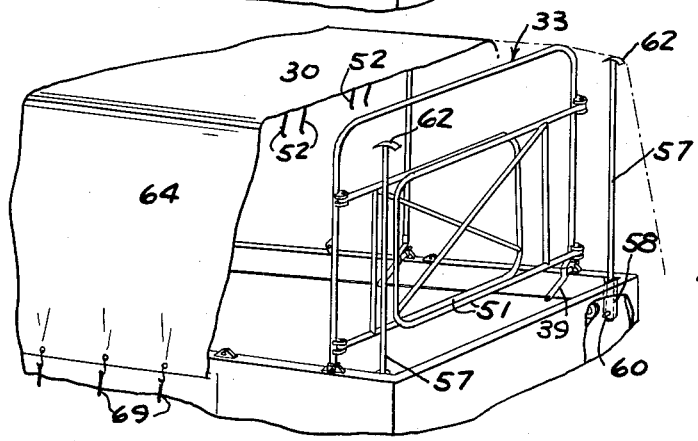
Fig. 8 is a view similar to Fig. 7, parts being shown in partly collapsed condition.

The frame assembly 31 also includes collapsible means at the forward end for holding the boot extension 32 in expanded condition. As shown in Fig. 7, this means includes a pair of gates 51 made of tubular material and pivoted to side bars 35 of the bow 33 at the forward end of the trailer, for movement about a vertical axis. Gates 51 swing from a position extending generally longitudinally as shown in Fig. 7 to a position generally transversely of the trailer as shown in Fig. 8. A removable cross piece 53 is provided between the upper bars of gates 51 for holding the gates in extended position. As shown in Fig. 4, cross piece 53 includes curved shoes 54 at the ends thereof provided with thumb screws 55 which engage threaded holes in the upper bars of gates 51 to lock the cross piece 53 in position.

As shown in Fig. 7, removable braces 56 are provided between the sides of trailer 20 and side bars 35 of the bow 33 in order to strengthen the bow for forwardmost bow 33 in order to strengthen the bow for supporting the gates 51. Braces 56 are held in position by means of bolts which can be removed in order to remove the braces as shown in Fig. 8 and permit the forward bow 33 with the gates 51 to pivot downwardly and rearwardly as shown in Fig. 9.

Figure 9:
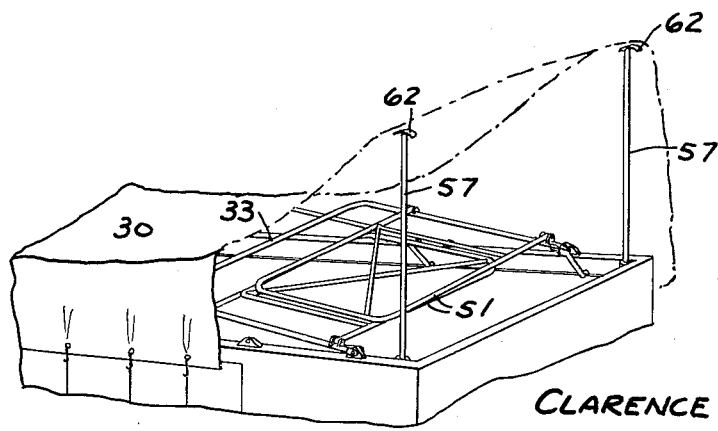
Fig. 9 is a view similar to Fig. 8 showing the parts in a further collapsed condition.

As shown in Figs. 7, 8 and 9, posts 57 are mounted in tubular sockets 58 in the forward end of the trailer and are movable upwardly to support the forward end of cover 30 during the folding of the gates 51 and the forward bow 33. As shown in Figs. 7 and 8, the lower end of each post is provided with a hole 59 which is engaged by a bolt 60 when the post is elevated. Curved pieces 62 are provided on the upper ends of vertical posts 57 to prevent the upper ends of the posts from cutting or tearing the cover 30. Referring to Fig. 1, removable braces 61 are provided for the side bars of rear bow 42 and are removably positioned by means of bolts in the same manner as braces 56. Strings 52 may be fastened to the cover 30 and are adapted to be tied around bars 34 to assist in maintaining cover 30 in extended position (Fig. 7).

As shown in Fig. 3, in extended position cover 30 forms a top 63 and side 64 for the upper deck. A short panel 65 is fastened to the inner surface of each side 64 along longitudinally extending lines 66 and the end of the panel 65 is secured to sides 27 of the trailer by being clamped between a longitudinally extending bar 67 and the side walls 27, bolts 68 passing through the bar 67, panel 65 and side walls 27. In extended position the cover 30 is maintained taut over the bows 33, 42 to prevent the cover from whipping in the wind by means of elastic cords 69 which are provided with hooks 70 at the ends thereof, one hook engaging a grommet 71 in the lower edge of the sides 64 and the other hook engaging a longitudinally extending bar 72 on the side walls 27 of the trailer.

With the frame assembly 31 in extended position and the cover 30 supported by the frame assembly 31 as shown in Figs. 1, 3 and 7, vehicles may be loaded on the upper track 26, the flexible cover 30 providing sufficient room to permit an operator to leave the vehicle without requiring any access openings or doors in the sides of the cover 30. After loading the rear end of cover 30 is closed by any suitable flexible panel such as is commonly used to close the ends of trucks.

After the vehicles have been loaded, the trailer may be used to transport the vehicles to any desired destination. The cover 30 supported by the frame assembly 31 provides an effective protection for the vehicles against the elements such as rain, snow, sand and wind. Since no part of the cover contacts any of the vehicles, there is no danger that the surface of the vehicles will be scratched or damaged by rubbing of the cover.

After the trailer reaches the destination, the vehicles are unloaded from both the upper and the lower tracks and the frame assembly 31 is collapsed to reduce the overall height of the trailer for the return trip.

In order to collapse the frame assembly the elastic cords 69 are disconnected from bar 72. The vertical posts 57 are then pulled upwardly to extended position as shown in Fig. 8 and cross piece 53 is removed. Gates 51 are folded inwardly. Braces 56 at the front end and braces 61 at the rear end are removed and the power drum 47 is operated to pivot the bows 33 downwardly and rearwardly and the rear bow 42 downwardly and forwardly. Posts 57 prevent cover 30 from being drawn rearwardly when bows 33 swing downwardly and rearwardly. The vertical posts 57 are then lowered. At this point the cover 30 assumes the position shown in Fig. 5 with the side portions 64 of the cover overhanging the sides of the trailer. The extension boot 32 is folded neatly back over the front of the trailer. The overhanging side portions 64 are then folded upwardly and inwardly onto the top of the trailer and the elastic cords which have one end thereof in grommets 71 are pulled and the other ends thereof connected to each other as shown in Fig. 6 to tie down the cover 30 in flattened condition. This provides a neat and compact appearance and the folded cover does not have any loose portions that would flap in the wind. The trailer is then in condition for an economical return trip.

When it is again desired to load the trailer, the reverse procedure is followed in order to move the frame assembly 31 and the cover 30 to extended position.

A modified form of the invention is shown in Figs. 10 through 14. As shown in Fig. 10, covers 75 forms a closure for the top deck of the trailer and has a boot extension 76 at the forward end thereof. The frame assembly 77 which supports cover 75 comprises a plurality of longitudinally spaced bows 78, each of which includes a cross bar 79 and side bars 80. The bows 78 are vertically movable from an extended position shown in Fig. 10 to a collapsed position shown in Fig. 13. As shown in Fig. 11, the lower end of each side bar 80 passes through a cylindrical guide block 81 on the trailer side wall. A pulley 82 is mounted on the lower end of each side bar 80 and pulleys 83, 84 are supported on the side wall 27. A cable 85 is trained around pulleys 82, 83 and 84 as shown in Fig. 11. It should be understood that a cable is provided at each side wall 27 of the trailer to equalize the force on the bows 79.

As shown in Fig. 10, one end of each cable is fastened at 86 to the rear end of the trailer while the other end passes over a pulley 87 to a power drum or winch 88. When the drum 88 is operated to unwind cable 85 therefrom, the bows 78 are permitted to move downwardly under their own weight and the weight of cover 75 to a lowered position wherein the cross bars 79 of the bows are adjacent the top of the trailer. When the drum 88 is operated to wind up cable 85, the bows 78 are moved upwardly into extended position.

As shown in Figs. 10 and 12, rectangularly shaped gates 89 are provided for supporting boot extension 76 in extended position. Each gate 89 includes front and rear upright bars 90, 90a and upper and lower cross bars 91, 91a reinforced by a diagonal brace 92. Bars 91a pass through a collar 93 having a projection 94 rotatably mounted in a socket 95 on a front portion of the trailer. A set screw 96 passes through collar 93 for locking bar 91a in position. In the erected or extended position each gate 89 extends forwardly beyond the front end of the trailer and the lower end of bar 90a engages a notch 97 in a plate 98 mounted on the side wall 27. Set screw 96 is tightened to hold the gate in extended position.

When it is desired to collapse cover 75, set screws 96 are loosened permitting the gates 89 to slide forwardly and disengage bars 90a from notches 97. Gates 89 may then be swung inwardly in opposite directions about the axis of sockets 95 to bring the plane thereof generally transversely of the trailer. The gates are then pivoted downwardly and rearwardly about the axis of collars 93 to bring them into overlying relationship with the top of the trailer.

As shown in Fig. 11, cover 75 when in extended position forms a closure on the top deck having a top wall 99 and side walls 100. A longitudinally extending fabric panel 101 of substantial width is fastened along its upper edge to the inner surface of side wall 100 along line 102 and to the upper end of side wall 27 by being clamped between bar 103 and the side wall 27. When the frame assembly 77 is in extended position, cover 75 is held taut by means of elastic cords 69 extending between the lower edge of side walls 100 and a longiutdinally extending bar 104 on the sides of the trailer. When the frame assembly is collapsed, the side walls 100 of the cover extend downwardly along the sides of the trailer and the lower ends of cord 69 are attached ot a second bar 105 to hold the sides taut along the sides of the trailer and to hold the cover in compact folded condition (Fig. 14).

I claim:

1. In a trailer for transporting vehicles having upper and lower vehicle suporting decks and means forming an enclosure for vehicles on the lower deck, a plurality of supports pivoted to longitudinally spaced points on the trailer, whereby said supports may be pivoted from a collapsed lowered position to an operative raised position projecting above the upper deck, the foremost of said supports being movable from a raised position rearwardly to a collapsed position, the rearmost of said supports being movable from a raised position forwardly to a collapsed position, and a flexible cover on said supports adapted to be raised and lowered thereby, said cover in the raised position of said supports forming an enclosure for vehicles and said upper deck.

2. The combination set forth in claim 1 including means for raising and lowering said supports in unison.

3. The combination set forth in claim 2 wherein said means for raising and lowering said supports includes a cable having a double run, said foremost support being pivotally connected to said cable at a point along one of said runs, said rearmost support being pivotally connected to said cable at a point on the other of said runs, the intermediate supports being pivotally connected to said cable at spaced points along the length thereof.

4. In a trailer for transporting vehicles having upper and lower vehicle supporting decks and means forming an enclosure for vehicles on the lower deck, a plurality of supports on said trailer movable from a collapsed lowered position to an operative raised position projecting above the upper deck, means for raising and lowering said supports, a flexible cover on said supports adapted to be raised and lowered thereby, said cover in the raised position of said supports forming an enclosure for vehicles on said upper deck, an extension at the forward end of said cover having a bottom wall and flexible top and side walls, and additional support means for supporting said extension beyond the front end of the upper deck for accommodating a portion of a vehicle at the front end of the upper deck which projects beyond the forwardly positioned wheels of the vehicle, said additional support means being movable from an operative position supporting said extension to a collapsed position adjacent said upper deck.

5. The combination set forth in claim 4 wherein said additional support means comprise a pair of gates, one at each side of the upper deck pivoted on the trailer for swinging movement about a vertical axis adjacent the front end of the upper deck, a removable brace extending between said gates adjacent their free ends to hold the gates in a forwardly extended spaced apart position against the inner faces of said side walls of said extension, said gates being supported for pivotal movement about a horizontal axis, whereby when said gates are swung inwardly from said extended position to a position extending transversely of the trailer they may be pivoted downwardly toward the plane of the upper deck.

6. The combination set forth in claim 4 wherein the foremost support is pivoted to said trailer for movement from an operative position downwardly and rearwardly to a collapsed position, said additional support means comprising a pair of gates pivoted to the foremost support on said trailer, one at each side of the upper deck for swinging movement about a vertical axis, and a removable brace extending between said gates adjacent their free ends to hold the gates in a forwardly extended spaced apart position against the inner faces of said side walls of said extension, whereby when said gates are swung inwardly from said extended position to a position extending transversely of the trailer and the foremost support is moved from an operative position to a collapsed position the gates are also moved to a collapsed position.

7. The combination set forth in claim 4 wherein each said support is U-shaped, the legs of each support being pivotally mounted on the trailer adjacent their lower ends for pivotal movement to an upright position and to a lower position wherein the supports lie generally on said upper deck, said means for raising and lowering said supports comprising a cable, means for connecting said supports to longitudinally spaced points on said cable, and means for actuating said cable axially in opposite directions to pivot said supports to an upright position and to a lower position.

8. The combination set forth in claim 4 wherein said supports are U-shaped, means for mounting said supports for bodily movement in a vertical direction to and from operative and collapsed positions, said means for raising and lowering said supports including pulley means adjacent the legs of each said support, and a cable trained over said pulleys and operatively connected to the lower ends of said legs of said supports.

9. In a trailer for transporting vehicles having upper and lower vehicle supporting decks and means forming an enclosure for vehicles on the lower deck, a plurality of supports on said trailer movable from a collapsed lowered position to an operative raised position projecting above the upper deck, a flexible cover on said supports adapted to be raised and lowered thereby, said cover in the raised position of said supports forming an enclosure for vehicles on the upper deck and having a side wall portion along each side of the upper deck and a top wall portion connecting the upper edges of said side wall portions, said side wall portions being fastened along their lower edges to the trailer generally at the level of said upper deck, a flap portion for each side wall portion of the cover connected to the side wall portion above the line of attachment of the cover to the trailer, and means extending between said flap portion and said trailer for exerting a downward pull on said flap portion for holding the cover taut on said supports when the latter are in raised position.

10. The combination set forth in claim 9 wherein said horizontally extending flap portions are connected to the side wall portions along a line adjacent the upper edge of said side wall portions whereby when said supports are collapsed said cover is permitted to shift vertically downwardly with said flap portions overlying the side wall portions of the cover, said means for exerting a downward pull on said flaps being adapted to be anchored on the trailer at a level below said upper deck for maintaining said flap portions and said top wall in taut condition when the supports are collapsed.

11. The combination set forth in claim 9 wherein said flap portions are connected with said side wall portions along a horizontal line spaced above and adjacent the line of attachment of the side wall portions with the trailer whereby when the supports are collapsed, said side wall portions are adapted to be folded upwardly and inwardly to overlie the top wall portion and said flap portions folded inwardly over the folded side wall portions and tied together transversely of the trailer to hold said top and folded side wall portions in compact relation.

12. The combination set forth in claim 9 wherein said supports are U-shaped, the legs of each U-shaped support being pivotally mounted on the trailer adjacent their lower ends for pivotal movement to an upright position and to a lower position, and means for pivoting said U-shaped supports comprising a cable, said supports being pivoted to longitudinally spaced points on said cable, and means for actuating said cable axially in opposite directions to pivot said supports to an upright position and to a lower position.

13. The combination set forth in claim 9 wherein said supports are U-shaped, means for mounting said U-shaped supports for bodily movement in a vertical direction to and from operative and collapsed positions, and means for raising and lowering said supports including pulley means adjacent the legs of each said support, and a cable trained over said pulleys and operatively connected to the lower ends of the legs of said supports.

14. The combination set forth in claim 9 wherein said flap portions are connected with said side wall portions along a horizontal line spaced above and adjacent the line of attachment of the side wall portion with the trailer, the vertical extent of each flap portion being substantially no greater than one half the width of said top wall portion, whereby when the supports are collapsed, said side wall portions are adapted to fold upwardly and inwardly to overlie the top wall portion and said flap portions are adapted to be folded inwardly over the folded side wall portions and tie together transversely of the trailer to hold said top and folded side wall portions in compact relation.

15. In a trailer for transporting vehicles having upper and lower vehicle supporting decks and means forming an enclosure for vehicles on the lower deck, a plurality of generally inverted U-shaped supports extending transversely of the trailer and spaced longitudinally thereof, said supports being pivotally mounted adjacent the free ends of the legs of the U on the trailer along a line adjacent the plane of the upper deck, so that they may be pivoted to an upright operative position projecting above the upper deck and to a lowered collapsed position wherein they lie generally on said upper deck, a cover extending longitudinally of the trailer and overlying said supports, said cover having a top wall and opposite side walls, said side walls being connected along their lower edges to the trailer adjacent the plane of the upper deck, said cover being dimensioned such that when said supports are pivoted to an upright position the cover is supported by the supports to form an enclosure for vehicles on said upper deck, the foremost support at the front end of the trailer being movable downwardly and rearwardly from operative to collapsed position and the rearmost support at the rear of the trailer being movable downwardly and forwardly from operative to collapsed position, the supports slidably engaging the inner faces of the cover during the movement of the supports, and means adjacent the front end of the trailer for holding the top and side walls of the cover against substantial movement rearwardly of the trailer when the supports are pivoted from said upright to said collapsed position.

16. The combination set forth in claim 15 wherein said last-mentioned means comprise a pair of vertically extending supports at the forward end of said upper deck, said supports being movable to an operative position wherein their upper ends engage the top wall of the cover when the cover is in operative position.

17. In a trailer for transporting vehicles having upper and lower vehicle supporting decks and means forming an enclosure for vehicles on the lower deck, a plurality of supports at fixed longitudinally spaced points on said trailer, said supports being movable from a collapsed lowered position to an operative raised position projecting above the upper deck, said supports having a generally inverted U shape and extending transversely of the trailer, the legs of each U-shaped support being pivoted on the trailer adjacent their lower ends for pivoting to an upright position and to a lower position wherein the supports lie generally on said upper deck, cable means operatively connected with the lower ends of said supports, means for actuating said cable axially in opposite directions for simultaneously raising and lowering said supports in unison, a flexible cover on said supports adapted to be raised and lowered thereby, said cover in raised position of said supports forming an enclosure for vehicles on said upper deck, and collapsible prop means at the forward end of the trailer movable independently of said U-shaped supports from a collapsed position to an operative position engaging the top wall of the cover at the forward end of the trailer to hold the top and side walls of the cover against substantial movement rearwardly of the trailer when the supports are pivoted from said upright to said collapsed position.

18. In a trailer for transporting vehicles having upper and lower vehicle supporting decks and means forming an enclosure for vehicles on the lower deck, a plurality of supports pivoted to longitudinally spaced points on the trailer, whereby said supports may be pivoted from a collapsed lowered position to an operative raised position projecting above the upper deck, a flexible cover on said supports adapted to be raised and lowered thereby, said cover in the raised position of said supports forming an enclosure for vehicles on said upper deck, and collapsible prop means at the forward end of the trailer movable independently of said U-shaped supports from a collapsed position to an operative position engaging the top wall of the cover at the forward end of the trailer for holding the top and side walls of the cover against substantial movement rearwardly of the trailer when the supports are pivoted from said upright to said collapsed position.

References Cited in the file of this patent

UNITED STATES PATENTS

| | | |
|---|---|---|
| 905,571 | Pangborn | Dec. 1, 1908 |
| 1,298,387 | Porcher | Mar. 25, 1919 |
| 2,463,646 | Schassberger | Mar. 8, 1949 |
| 2,469,958 | Fowler | May 10, 1949 |
| 2,591,186 | Neitzke | Apr. 1, 1952 |
| 2,656,216 | Bobroff | Oct. 20, 1953 |
| 2,668,734 | Bridge | Feb. 9, 1954 |
| 2,766,898 | Risner | Oct. 16, 1956 |

FOREIGN PATENTS

| | | |
|---|---|---|
| 1665 of 1914 | Great Britain | Dec. 24, 1914 |
| 15,918 | Great Britain | June 8, 1916 |
| 106,396 | Great Britain | May 24, 1917 |
| 323,361 | Great Britain | Jan. 2, 1930 |
| 932,071 | France | Nov. 17, 1947 |